(12) United States Patent
Kneidel

(10) Patent No.: US 8,746,424 B2
(45) Date of Patent: Jun. 10, 2014

(54) COIL SPRING TILGER DAMPER FIXED TO TURBINE

(75) Inventor: Craig Kneidel, Massillon, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 281 days.

(21) Appl. No.: 13/238,230

(22) Filed: Sep. 21, 2011

(65) Prior Publication Data

US 2012/0073925 A1    Mar. 29, 2012

Related U.S. Application Data

(60) Provisional application No. 61/385,689, filed on Sep. 23, 2010.

(51) Int. Cl.
*F16H 45/02* (2006.01)
*F16H 41/24* (2006.01)

(52) U.S. Cl.
USPC ........................ 192/3.29; 192/213.2

(58) Field of Classification Search
USPC ........................ 60/338; 192/213.2
See application file for complete search history.

(56) References Cited

U.S. PATENT DOCUMENTS

| 2007/0131506 A1* | 6/2007 | Wack et al. ............ 192/3.29 |
| 2009/0125202 A1 | 5/2009 | Swank et al. |
| 2011/0192692 A1 | 8/2011 | Werner et al. |
| 2011/0247322 A1* | 10/2011 | Lindemann et al. .......... 60/338 |

FOREIGN PATENT DOCUMENTS

| DE | 102007057431 | 6/2009 |
| DE | 102009042837 | 4/2010 |
| DE | 102009052202 | 6/2010 |
| WO | 2010063251 | 6/2010 |
| WO | 2011076168 | 6/2011 |
| WO | 2011122130 | 10/2011 |

* cited by examiner

*Primary Examiner* — Rodney Bonck
(74) *Attorney, Agent, or Firm* — Simpson & Simpson, PLLC

(57) ABSTRACT

A torque converter, including: a turbine with a turbine shell; and a damper assembly including: an output flange; a first cover plate; a first drive plate fixedly secured to the turbine shell; a first plurality of springs engaged with the first cover plate; a second plurality of springs engaged with the first cover plate and the output flange; a third plurality of springs engaged with the first cover plate and the first drive plate; and a single torque path from the turbine shell to the damper assembly, the single torque path formed by the first drive plate.

14 Claims, 5 Drawing Sheets

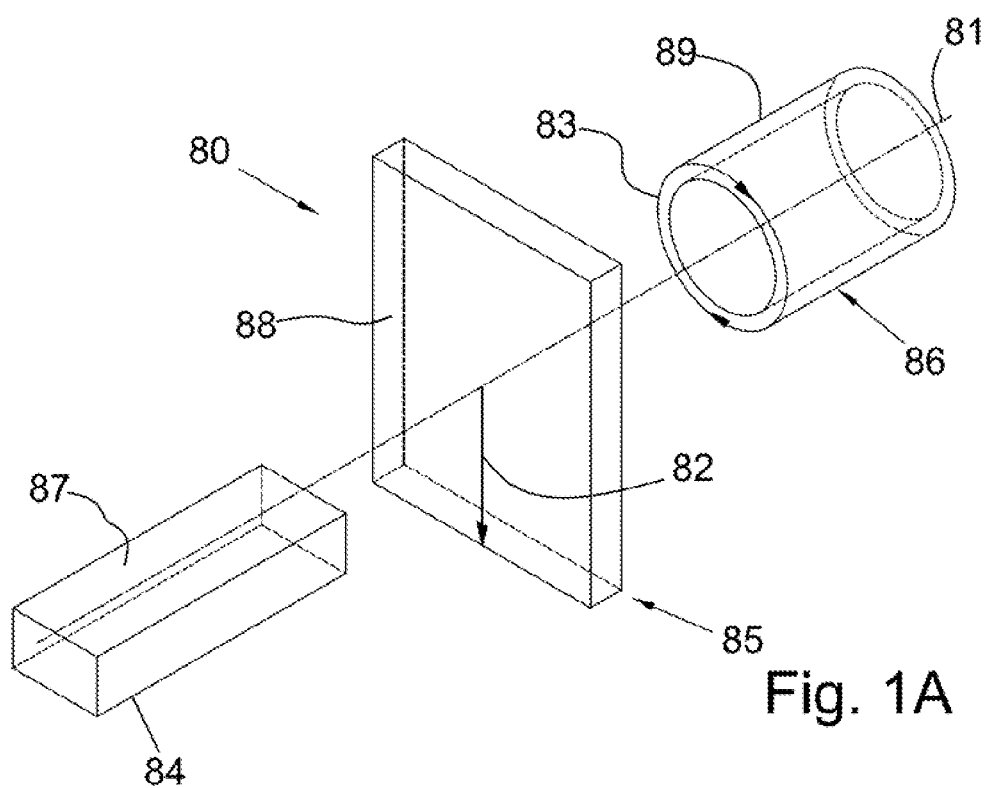
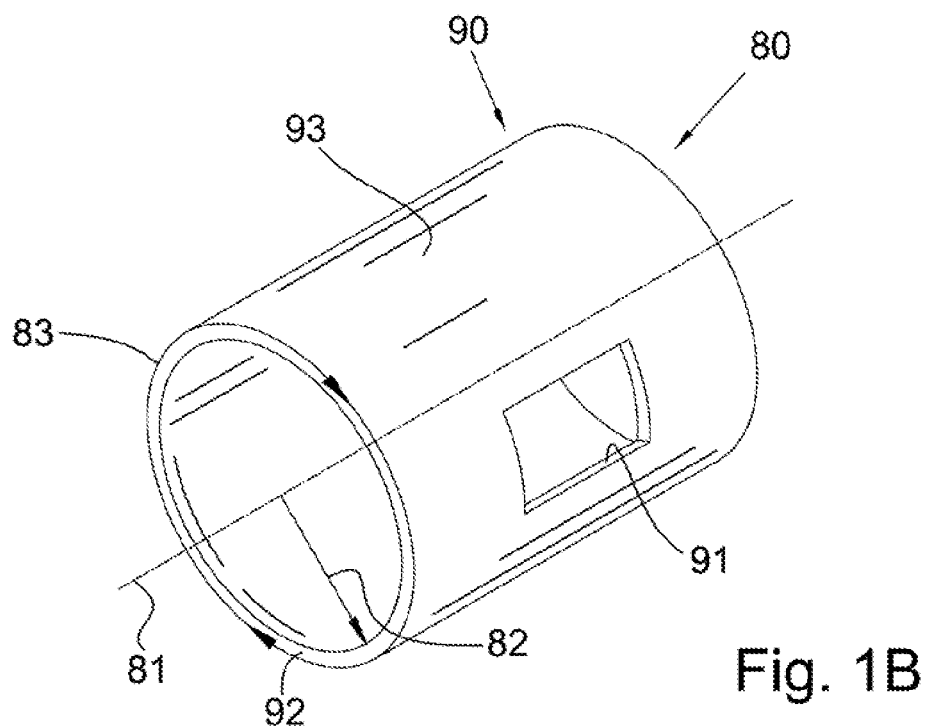

US 8,746,424 B2

COIL SPRING TILGER DAMPER FIXED TO TURBINE

CROSS-REFERENCE TO RELATED APPLICATIONS

This application claims the benefit under 35 U.S.C. §119 (e) of U.S. Provisional Application No. 61/385,689 filed on Sep. 23, 2010 which application is incorporated herein by reference.

FIELD OF THE INVENTION

The present disclosure relates to a damper assembly for a torque converter using inertia from a turbine to damper vibration. In particular, the present disclosure relates to a damper assembly for a torque converter with an additional plate fixed to the turbine.

BACKGROUND OF THE INVENTION

Commonly owned U.S. Patent Application Publication 2009/0125202 teaches a damper assembly in a torque converter with a cover plate fixed axially but not rotationally to a turbine, and a damper fixed to the turbine and the cover plate.

BRIEF SUMMARY OF THE INVENTION

According to aspects illustrated herein, there is provided a torque converter, including: a turbine with a turbine shell; and a damper assembly including: an output flange; a first cover plate; a first drive plate fixedly secured to the turbine shell; a first plurality of springs engaged with the first cover plate; a second plurality of springs engaged with the first cover plate and the output flange; a third plurality of springs engaged with the first cover plate and the first drive plate; and a single torque path from the turbine shell to the damper assembly, the single torque path formed by the first drive plate.

According to aspects illustrated herein, there is provided a torque converter, including: a cover; a turbine with a turbine shell; a lock up clutch including a piston plate, friction material, and a first drive plate; and a damper assembly including: an output flange; a cover plate; a second drive plate fixedly secured to the turbine shell; a first plurality of springs engaged with the cover plate and the second drive plate; a second plurality of springs engaged with the cover plate and the output flange and circumferentially aligned with the first plurality of springs; and a third plurality of springs engaged with the cover plate and the first drive plate.

According to aspects illustrated herein, there is provided a torque converter, including: a turbine with a turbine shell and a damper assembly. The damper assembly includes: an output flange; a cover plate; a first plurality of springs engaged the cover plate; a second plurality of springs engaged with the cover plate and the output flange; a third plurality of springs, separate from the first and second pluralities of springs; a single torque path from the turbine shell to the damper assembly; a first torque path from the first plurality of springs to the output flange via the cover plate; a second torque path from the third plurality of springs to the cover plate; and a solid torque path, including the single torque path, from the turbine shell to the third plurality of springs.

These and other objects and advantages of the present invention will be readily appreciable from the following description of the invention and from the accompanying drawings and claims.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application;

DETAILED DESCRIPTION OF THE INVENTION

Figure 2:
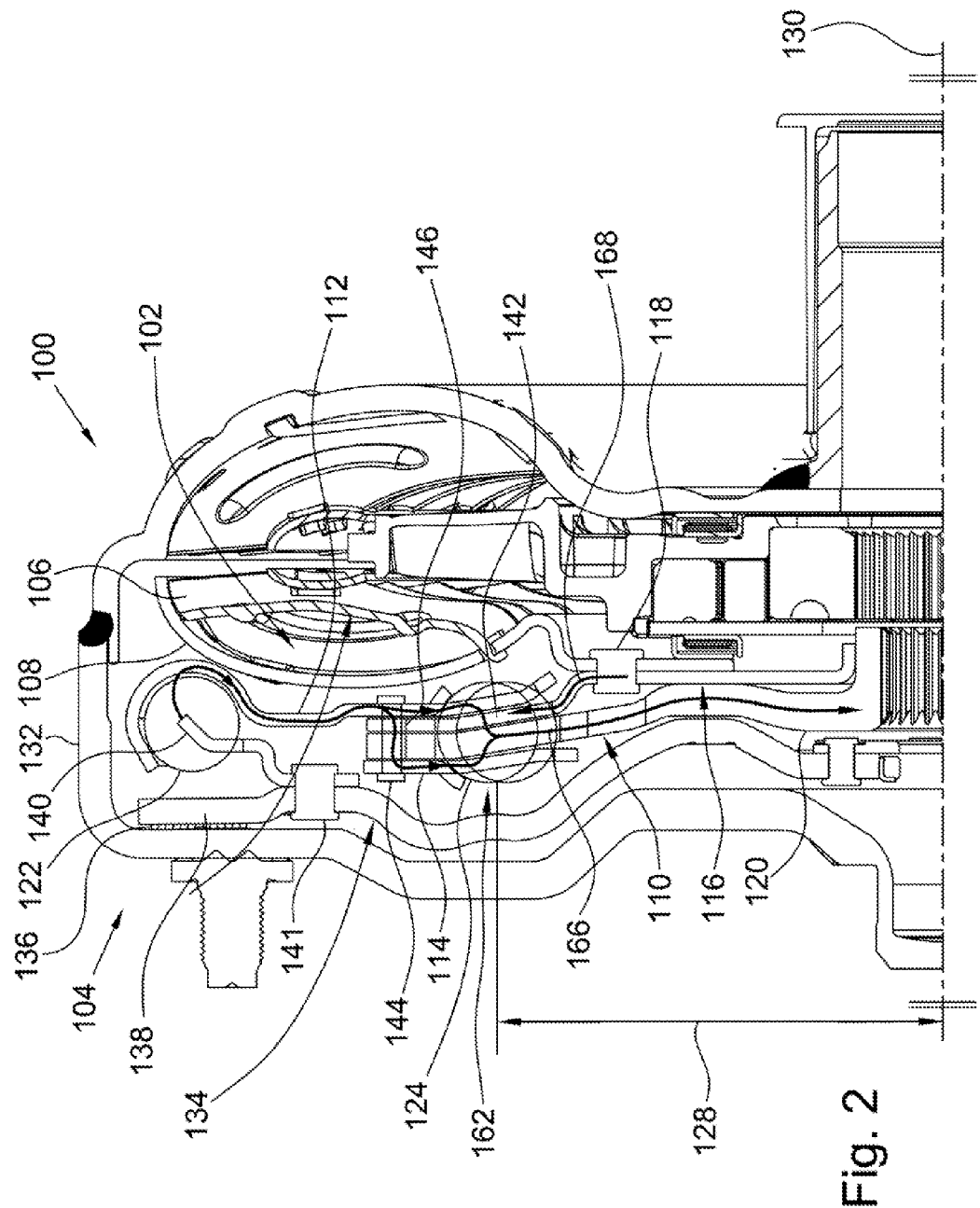
FIG. 2 is a partial cross-sectional view of a torque converter with a damper assembly and drive plate connected to a turbine and fasteners as rotational stops for the drive plate.

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

FIG. 2 is a partial cross-sectional view of torque converter 100 with a damper assembly and drive plate connected to a turbine and fasteners as rotational stops for the drive plate.

Figure 3:
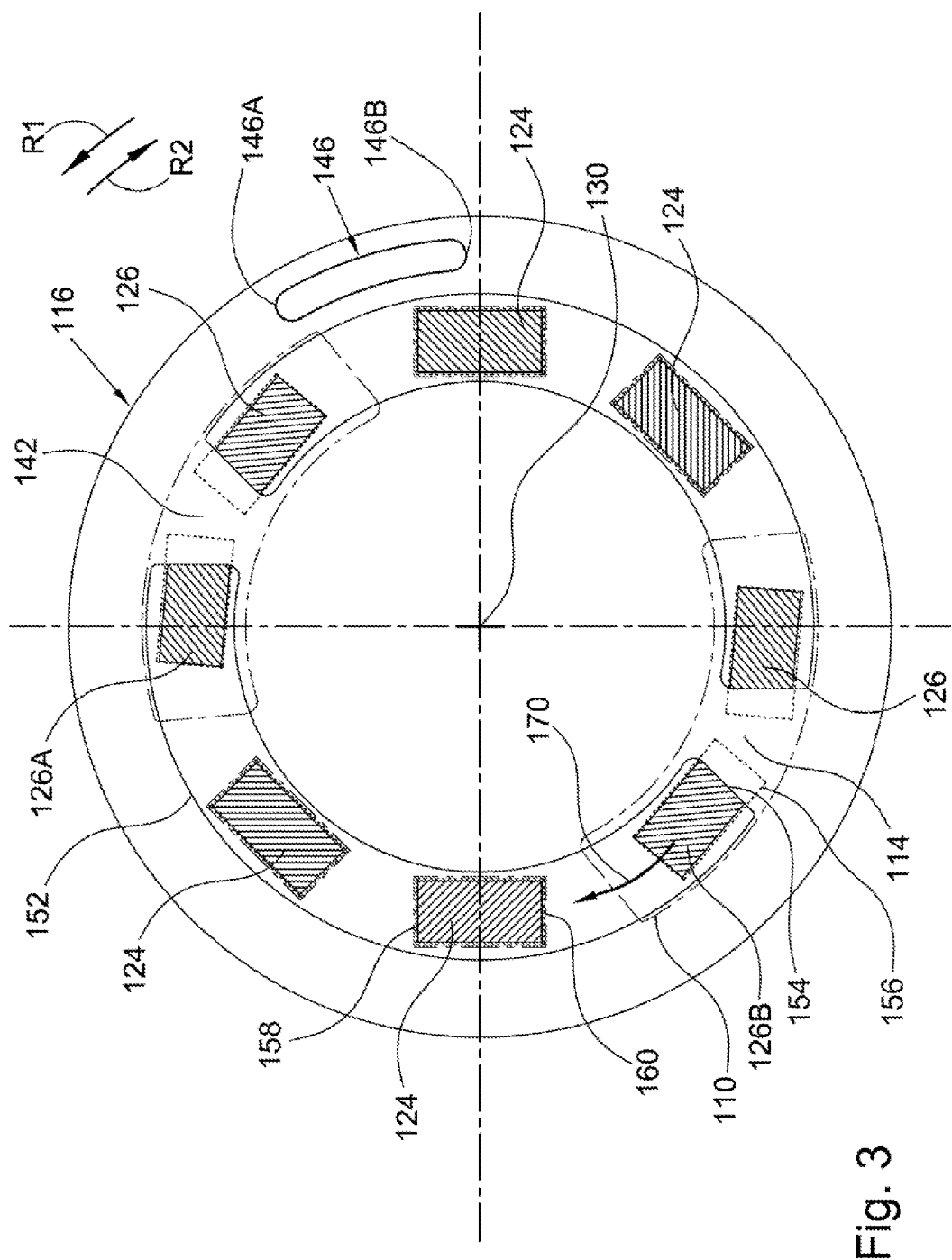
FIG. 3 is a back view of a portion of the damper assembly shown in FIG. 2.

FIG. 3 is a back view of a portion of damper assembly 102 shown in FIG. 2. The following should be viewed in light of FIGS. 2 and 3. Torque converter 100 includes damper assembly 102, lock up clutch 104, and turbine 106 with turbine shell 108. The damper assembly includes output flange 110, cover plates 112 and 114, and drive plate 116 fixedly secured to the turbine shell. Drive plate 116 can be fixed to the turbine by any means known in the art, for example, rivets 118. Radially inward portion 120 of flange 110 is configured to engage an input shaft (not shown), for example, for a transmission.

The damper assembly also includes: plurality of springs 122 engaged with cover plate 112 and the lock up clutch; plurality of springs 124 engaged with cover plates 112 and 114, and the output flange; and plurality of springs 126 engaged with cover plates 112 and 114, and drive plate 116. Springs 126 can be referred to as turbine tilger springs. In one embodiment springs 124 and 126 are at a same radial distance 128 from axis of rotation 130 for the torque converter and plurality 122 is disposed radially outward from pluralities 124 and 126.

The torque converter includes cover 132 and the lock up clutch includes axially displaceable piston plate 134 and friction material 136. Specifically, radially outward portion 138 of the piston plate is axially displaceable such that in an engaged position for the clutch the friction material is engaged with, or in contact with, the cover and the piston plate and torque is transferable from the cover to the piston plate. The lock up clutch is directly engaged with, or in contact with, springs 122. In one embodiment, the lock up clutch includes drive plate 140 fixedly connected to the piston plate by any means known in the art, for example, rivets 141, such that drive plate 140 rotates with the piston plate. Drive plate 140 is in direct contact with spring 122.

In one embodiment, portion 142 of drive plate 116 is disposed axially between the output flange and cover plate 112. Drive plate 116 is rotatable relative to the flange and the cover plates 112 and 114. In one embodiment, rotation of drive plate 116 is restricted by fasteners 144, for example, sheet metal rivets, connecting cover plates 112 and 114. For example, drive plate 116 includes slots or notches 146 and fasteners 144 pass through the slots. To simplify the presentation, a single slot is shown; however, it should be understood that any number of slots 146 can be present in plate 116. The slots have respective circumferential ends 146A and 146B and if drive plate 116 rotates sufficiently in rotational direction R1 or R2, the respective ends contact the fasteners, the rotation of the plate is halted, and if force is applied to drive plate 116 in the same rotational direction, springs 124 continue to compress. For example, if drive plate 116 rotates sufficiently in rotational direction R1, ends 146B contact the fasteners, the rotation of the plate is halted, and if force is applied to drive plate 116 in direction R1, springs 124 continue to compress.

Figure 4:
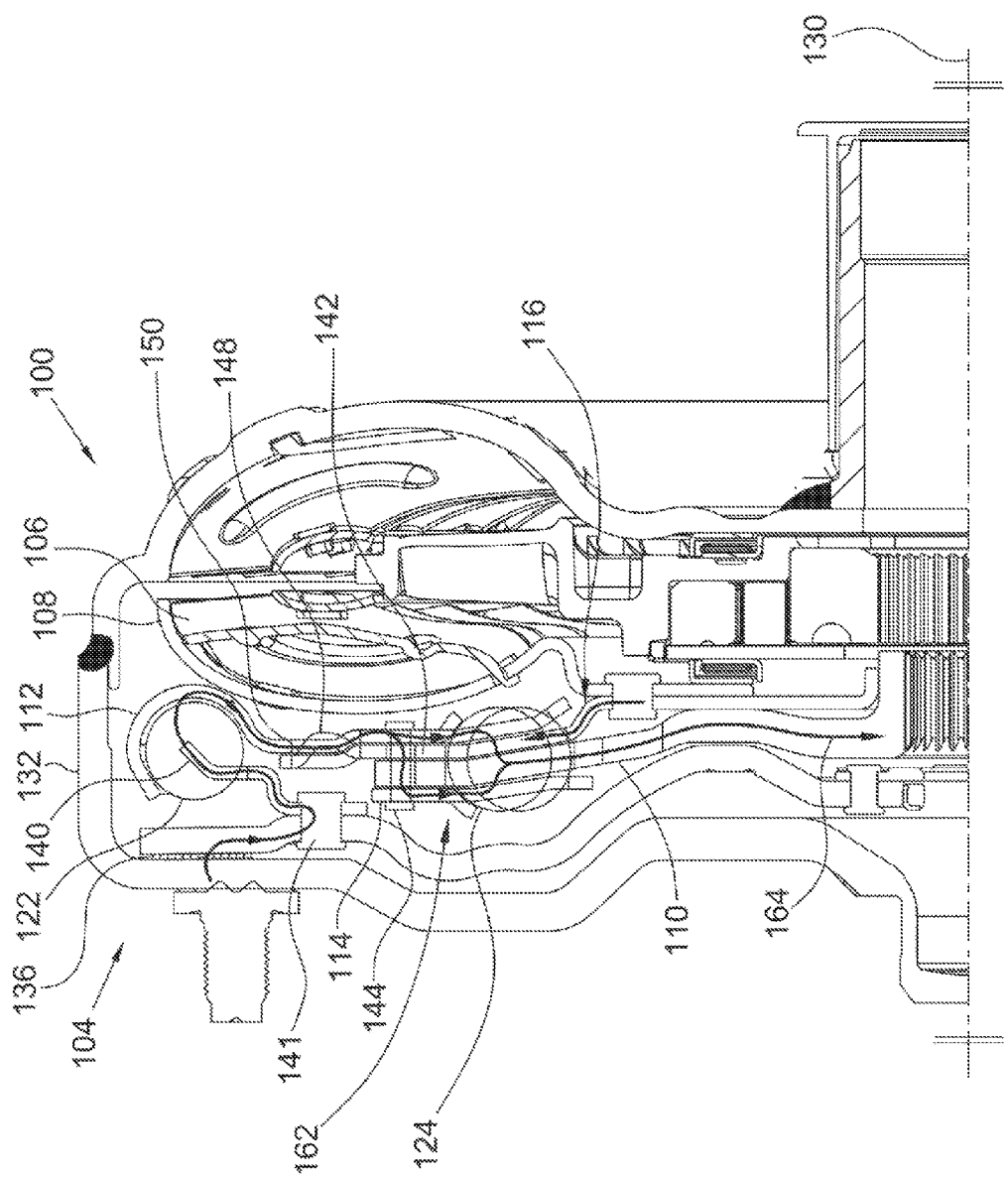
FIG. 4 is a partial cross-sectional view of a torque converter with a damper assembly and drive plate connected to a turbine and tabs on the drive plate as rotational stops for the drive plate; and, FIG. 5 is a partial cross-sectional view of a torque converter with a damper assembly and drive plate connected to a turbine with radially intermediate springs.

FIG. 4 is a partial cross-sectional view of torque converter 100 with a damper assembly and drive plate connected to a turbine and tabs on the drive plate as rotational stops for the drive plate. In one embodiment, portion 142 of the drive plate is disposed axially between the output flange and cover plate 112. Drive plate 116 is rotatable relative to the flange and the cover plates 112 and 114. In one embodiment, rotation of drive plate 116 is restricted by tabs, or axial extensions, 148 on drive plate 116. For example, cover plate 112 includes slots 150 and tabs 148 are disposed in the slots. The slots have respective circumferential ends and if drive plate 116 rotates sufficiently in either rotational direction, the respective ends contact the tabs, the rotation of the plate is halted, and if force is applied to drive plate 116 in the same rotational direction, springs 124 continue to compress.

Returning to FIG. 3, respective ends of springs 126 are engaged with slots 152 in drive plate 116. In FIG. 3, the springs are engaged with ends 154 of slots 152. The other respective ends of springs 126 are engaged with slots 156 in cover plate 114. Springs 124 are engaged with slots 158 and 160 in cover plate 114 and the output flange, respectively. In one embodiment, slots 158 and 160 have essentially the same dimensions and are axially aligned in a rest position for the damper assembly.

Figure 5:
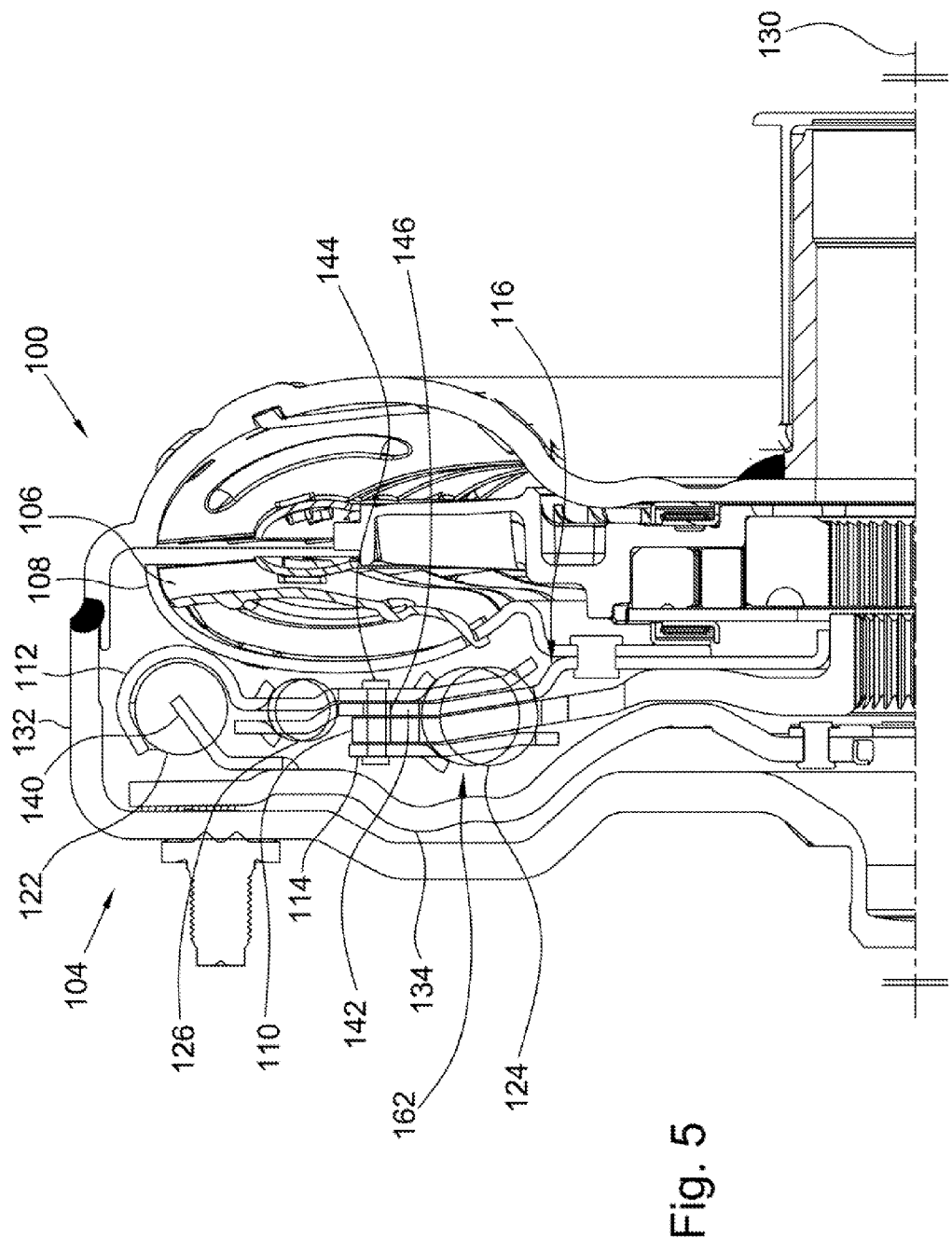

FIG. 5 is a partial cross-sectional view of torque converter 100 with a damper assembly and drive plate connected to a turbine with radially intermediate springs. In one embodiment, springs 126 are engaged with cover plate 112 and drive plate 116 and are disposed radially between springs 122 and 124. In one embodiment, portion 142 of drive plate 116 is disposed axially between the output flange and cover plate 112. Drive plate 116 is rotatable relative to the flange and cover plates 112 and 114. In one embodiment, rotation of drive plate 116 is restricted by fasteners 144, for example, rivets, connecting the cover plates 112 and 114. For example, drive plate 116 includes slots 146 and fasteners 144 pass through slots 146. Slots 146 have respective circumferential ends and if drive plate 116 rotates sufficiently in either rotational direction, the respective ends contact the fasteners, the rotation of the plate is halted, and if force is applied to drive plate 116 in the same rotational direction, springs 124 continue to compress.

Advantageously, the arrangement of FIG. 5 enables an increase in the number of springs 124 and/or 126 in the damper assembly. For example, circumferential space occupied by springs 126 in FIGS. 2 through 4 is available for additional springs 124, since springs 126 are disposed radially between springs 122 and 124. Increasing the number of springs 124 improves the performance of the damper assembly. Further, the spaces occupied by springs 124 in FIGS. 2 through 4 is available for additional springs 126 if desired.

The following should be viewed in light of FIGS. 2 through 5. Damper assembly 102 includes opposed pairs of coil springs 126, for example, springs 126A and 126B, preloaded such that there is a zero total pre-toad on plate 116. Plate 116 drives springs 126. In one embodiment, inner damper 162 of the double damper configuration of damper 102 is split into two function portions. The turbine tilger damper portion of the split damper, using the cover plates and plate 116, is used for the turbine tilger springs. The other portion of the split damper, including the cover plates and the flange, is used for the main stage of the damper wind-up and springs 124.

In FIG. 3, four springs 124 and four springs 126 are shown. However, it should be understood that torque converter 100 is not limited to any particular number of springs 124 and 126. The actual number of springs 124 and 126 used could depend on the envelope and the torque requirements for a particular design of torque converter 100. The concept shown is intended to illustrate the concept of the tilger riveted intermediate drive plate. An example, of the function of the design illustrated in the present disclosure is shown by torque path 164 in FIG. 4. Torque is transmitted to the cover and enters the damper through the lock up clutch and plate 140 to wind up cover plates 112 and 114. The torque then winds up the main stage inner damper springs 124, which then transmit the torque to the flange.

During operation, the turbine inertia as embodied by the turbine shell and plate 116, is connected to portion 162 via plate 116 and springs 126. Thus, a torque converter of the present disclosure advantageously links inertia for a turbine with a damper assembly and uses the inertia to cancel undesirable vibrations associated with an engine connected to the torque converter. For example, the vibrations and inertia of the turbine can be tuned to be out of phase with vibrations from an engine connected to the torque converter. In one embodiment, the turbine tilger damper portion requires a wind-up stop. As noted supra, a wind-up stop is provided by fasteners 144 and slots in plate 116 or by tabs 148 and slots in cover plate 112.

The operation of torque converter 100 noted above also can be described in terms of the torque paths shown in FIGS. 2 and 3. For example, torque path 166 is from springs 122 to flange 110 via cover plates 112 and 114. Solid torque path 168 is from the turbine shell to springs 126 and torque path 170 is from springs 126 to cover plates 112 and 114. By solid torque path we mean that the path does not include any elements, for example, springs or flexion devices, that would attenuate or absorb the torque. That is, the torque path is equivalent to solid piece of material joining the turbine shell and springs 126, for example, the torque path is formed by plate 116 fixed to the turbine shell. Torque transmitted along path 166 encounters torque transmitted along torque paths 168 and 170. Thus, for example, torque along path 166 can urge cover plates 112 and 114 in one direction, which in turn can urge the output flange in that direction. If the torque takes the form of a surge or spike, such displacement of the flange can be undesirable. However, torque along paths 168 and 170 can urge cover plates 112 and 114 in the opposite rotational direction, advantageously dissipating or attenuating an undesirable spike along path 166.

The turbine tilger configuration of the present disclosure provides advantages for manufacturing by making the assembly process easier and by eliminating the need for additional welds or rivets to accommodate the turbine tilger damper portion. The entire damper 102, including the turbine tilger damper portion, can be riveted in a single operation with fasteners, for example, rivets, 144, which are used to connect the cover plates During the riveting process, the tilger springs can be accessed by the assembly carrier. This access allows the use of assembly pins to preload the tilger springs, making the assembly of the driving intermediate plate possible. Finally, since the damper and turbine tilger is formed as a single riveted unit, it can be riveted to the turbine during the upset of the already-existing turbine fastener, for example, rivet 118. Thus, a torque converter of the present disclosure advantageously eliminates the need for a separate welded tab/ring on the turbine shell and eliminates the need for a preload spacer plate by providing a simpler method for assembly. A torque converter of the present disclosure also eliminates the need for any additional riveting operations or welds, which are required with prior art designs.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A torque converter, comprising:
    a turbine with a turbine shell; and,
    a damper assembly including:
        an output flange;
        a first cover plate;
        a first drive plate fixedly secured to the turbine shell;
        a first plurality of springs engaged with the first cover plate;
        a second plurality of springs engaged with the first cover plate and the output flange and free of engagement with the first drive plate;
        a third plurality of springs engaged with the first cover plate and the first drive plate and free of engagement with the output flange; and,
        a single torque path from the turbine shell to the damper assembly, the single torque path formed by the first drive plate.

2. The torque converter of claim 1 wherein the second and third pluralities of springs are at a same radial distance from an axis of rotation for the torque converter.

3. The torque converter of claim 1 wherein the second and third pluralities of springs are circumferentially aligned.

4. The torque converter of claim 1 wherein the third plurality of springs is disposed radially outward from the second plurality of springs.

5. The torque converter of claim 1 wherein the third plurality of springs is disposed radially between the first and second pluralities of springs.

6. The torque converter of claim 1 further comprising:
    a cover; and,
    a lock up clutch engageable with the cover and directly engaged with the first plurality of springs.

7. The torque converter of claim 6 wherein:
    the lock up clutch includes an axially displaceable piston plate and a second drive plate connected to the piston plate such that the second drive plate rotates when the piston plate rotates; and,
    the second drive plate is in direct contact with the first plurality of springs.

8. The torque converter of claim 1 wherein a portion of the first drive plate is disposed axially between the flange and the first cover plate.

9. The torque converter of claim 1 wherein the first drive plate is rotatable relative to the flange and the first cover plate.

10. The torque converter of claim 1 wherein:
    the damper assembly includes a second cover plate connected to the first cover plate by a plurality of fasteners; and,
    rotation of the first drive plate is restricted by the plurality of fasteners.

11. The torque converter of claim 1 wherein:
    the first cover plate includes a slot;
    the first drive plate includes an axial protrusion disposed in the slot; and, the rotation of the first drive plate is restricted by contact of the axial protrusion with respective ends of the slot.

12. A torque converter, comprising:
a cover;
a turbine with a turbine shell;
a lock up clutch including a piston plate, friction material, and a first drive plate; and,
a damper assembly including:
  an output flange;
  a cover plate;
  a second drive plate fixedly secured to the turbine shell;
  a first plurality of springs engaged with the cover plate and the second drive plate;
  a second plurality of springs engaged with the cover plate and the output flange and circumferentially aligned with the first plurality of springs; and,
  a third plurality of springs engaged with the cover plate and the first drive plate, wherein a portion of the second drive plate is disposed axially between the flange and the cover plate.

13. A torque converter, comprising:
a turbine with a turbine shell; and,
a damper assembly including:
  an output flange;
  a cover plate;
  a first plurality of springs engaged the cover plate and located at a first radial distance from an axis of rotation for the torque converter;
  a second plurality of springs engaged with the cover plate and the output flange and located at a second radial distance from an axis of rotation for the torque converter;
  a third plurality of springs, separate from the first and second pluralities of springs and located at a third radial distance, less than the first radial distance and greater than the second radial distance, from an axis of rotation for the torque converter;
  a single torque path from the turbine shell to the damper assembly;
  a first torque path from the first plurality of springs to the output flange via the cover plate;
  a second torque path from the third plurality of springs to the cover plate; and,
  a solid torque path, including the single torque path, from the turbine shell to the third plurality of springs.

14. The torque converter of claim 13 wherein:
first torque transmitted along the first torque path urges the cover in a first rotational direction; and,
second torque transmitted along the second torque path urges the cover in a second rotational direction, opposite the first rotational direction.

* * * * *